June 12, 1962  H. BERGESEN ETAL  3,038,231
CONCRETE-MOLDING PLANT

Filed July 24, 1959  4 Sheets-Sheet 1

Howard Bergesen
Innis O'Rourke, Jr.

*INVENTORS*

BY

AGENT.

June 12, 1962 H. BERGESEN ETAL 3,038,231
CONCRETE-MOLDING PLANT
Filed July 24, 1959 4 Sheets-Sheet 4
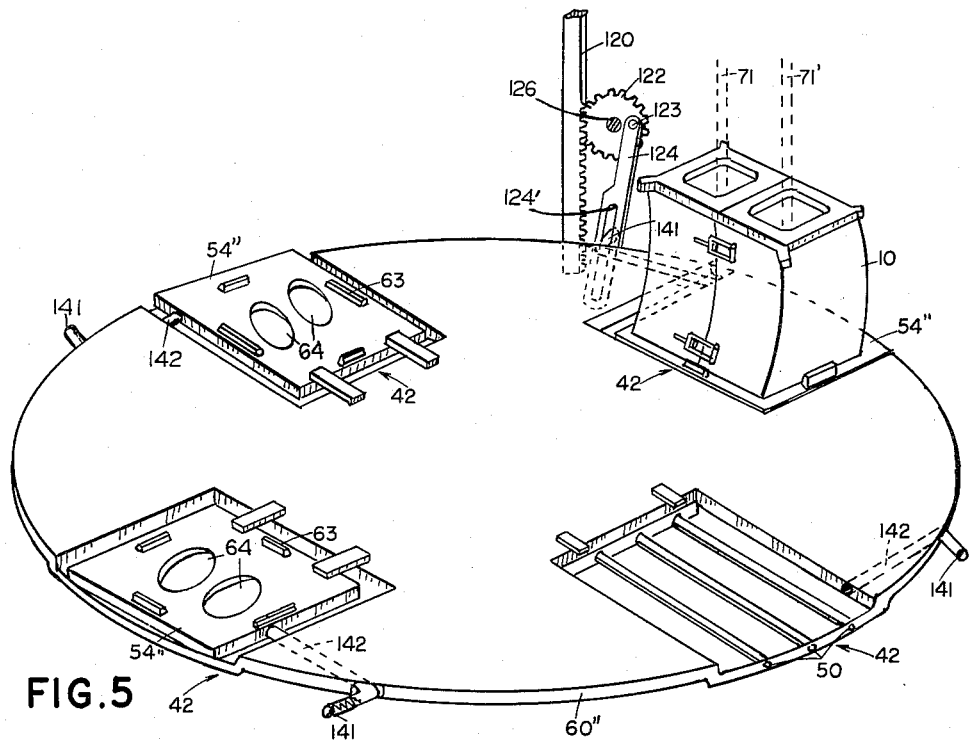
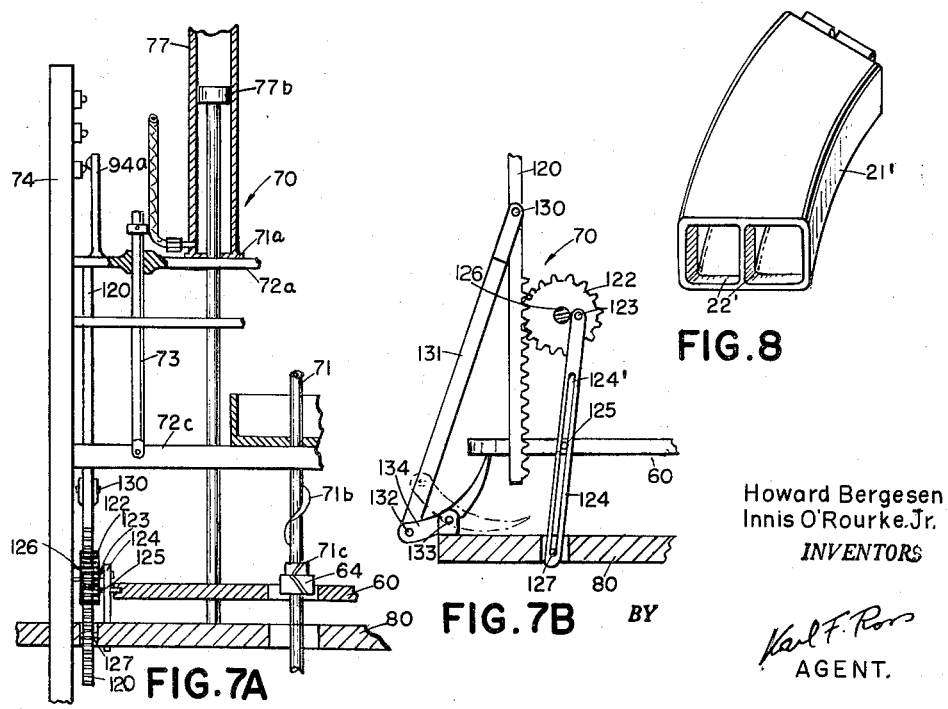
Howard Bergesen
Innis O'Rourke, Jr.
INVENTORS
Karl F. Ross
AGENT.

United States Patent Office 3,038,231
Patented June 12, 1962

3,038,231
CONCRETE-MOLDING PLANT
Howard Bergesen, Valley Stream, and Innis O'Rourke, Jr., Upper Brookville, N.Y., assignors to Concrete Conduit Corporation, Corona, N.Y., a corporation of New York
Filed July 24, 1959, Ser. No. 829,387
6 Claims. (Cl. 25—36)

Our present invention relates to a plant for molding concrete bodies, particularly (but not exclusively) sections of pipe adapted to be placed alongside one another to form a continuous conduit. This application is a continuation-in-part of our co-pending application Ser. No. 736,487 filed May 20, 1958.

In the production of concrete pipe and other concrete bodies having interior cavities, a wet mixture of sand and cement is shaped and compacted within a mold and removed therefrom for curing in a kiln or in air. It is desirable that the same compacting and shaping machine be used for molded bodies having arcuate as well as straight channels or cavities, that the compacting and shaping be carried out fully automatically to insure the necessary uniformity, and that the mold be readily positionable on the shaping machine.

It is an object of our invention to provide means for carrying out the above operations in a more satisfactory manner than heretofore and with a minimum of dependence upon manual labor.

Another object of this invention is to provide a concrete-shaping machine, adapted to be used in a plant of the character referred to, whose operating cycle can be readily adjusted to suit varying conditions.

A further, more specific object of this invention is to provide conveniently operable means for producing concrete bodies with one or more straight or curved channels.

According to an important feature of this invention, a plant for the molding of concrete bodies comprises a shaping machine including a combination of hydraulic and electrical control elements for initiating the pouring of concrete into a mold, shaping and compacting the concrete charge within the mold, and releasing the mold for removal of its contents.

Another feature of our invention resides in the provision of a mold locator, such as a turntable, for operatively positioning a mold to co-operate with the associated shaping machine in producing channeled concrete bodies of a predetermined configuration.

The above and other objects, features and advantages of our invention will become more readily apparent from the following detailed description of a preferred embodiment, reference being made to the accompanying drawing in which:

FIG. 5 is a perspective view of a turntable representing a modified mold locator according to our invention;

FIGS. 7A and 7B are fragmentary elevational views of a modification of the shaping machine of FIG. 2; and FIG. 8 shows a concrete body made by a plant according to the invention.

*General Description of the Plant (FIGS. 1–4)*

Figure 1:
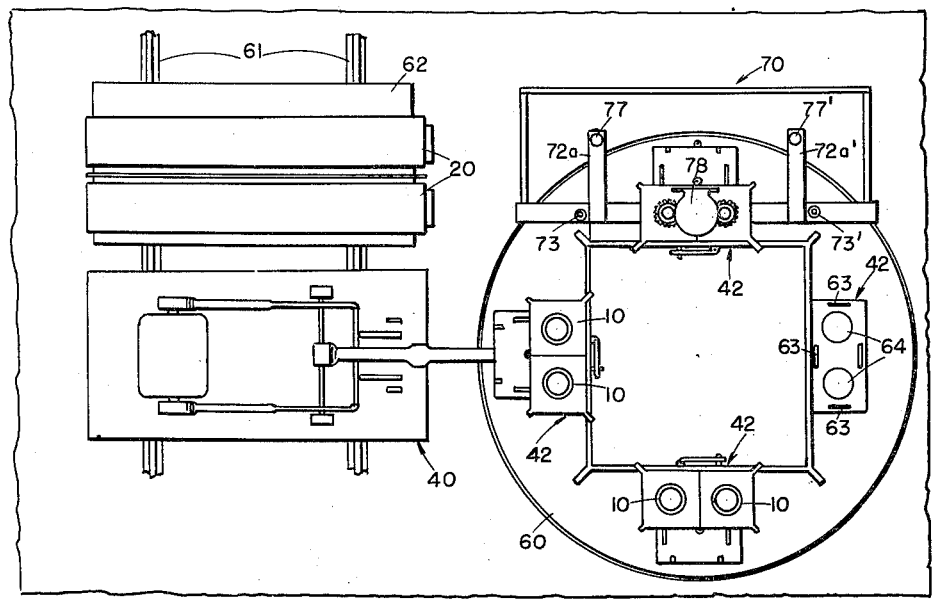
FIG. 1 is a somewhat diagrammatic top plan view of a plant according to the invention, showing the overall organization of its principal parts.

The principal parts of a plant according to our invention are shown in FIG. 1 as a mold positioner 40 (preferably of the type disclosed in our above-mentioned co-pending application), a shaping machine 70, and a mold locator in the form of a turntable 60 adapted to transport a number of molds 10 from the positioner 40 to the shaping mahcine 70 and vice versa, thus locating them to co-operate with the appropriate shaping and compacting elements. Advantageously, rails 61 are provided in the immediate vicinity of the mold positioner 40 over which shaped concrete bodies 20 can be transported to a drying station (not shown) by means of flat cars 62. Turntable 60 is provided with four mold-receiving posts 42, spaced 90° apart, which can be successively rotated past shaping machine 70 by suitable manual or automatic means symbolized by the motor 114 of FIG. 4. Turntable 60, shown supporting molds 10 on three of its four mold-receiving posts 42, has bores 64 coextensive with similar bores in each of the mold halves and is provided with lugs 63 to position molds 10 on receiving posts 42.

Figure 3:
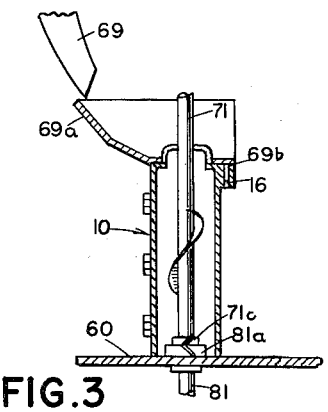
FIG. 3 is a detail view showing the operation of the packing elements of the machine of FIG. 2.

Shaping machine 70 has a frame comprising uprights 74, 74' (best shown in FIG. 2) on which there are slidably mounted two rigidly interconnected platforms 72a, 72b and a further platform 72c. Platform 72a mounts two rigid plates 72a' and 72a'' carrying two hydraulic cylinders 77, 77' respectively enclosing pistons 77b, 77b' whose rods 77a, 77a' are anchored to a floor 80 supporting the turntable 60. Platform 72a also carries an electric motor 78. Two vertical rods 73 and 73', secured to platform 72c at 73b, 73b', pass through platforms 72a and 72b and form a lost-motion connection therewith by means of collars 73a, 73a' positioned on these rods above platform 72a. Platform 72c supports an apron 69a designed to direct concrete from a hopper 69 into the mold 10 when the latter is operatively positioned therebelow on turntable 60, as illustrated in FIG. 3. Apron 69a also carries a depending pin 69b serving to maintain the proper position of mold 10 by operative engagement with a tube 16 on that mold.

The apron 69a is formed with a pair of holes through which pass the flanges of covers 11, 11' of mold 10 when the latter is in its operative position shown in FIG. 3. In that position the mold can also receive a pair of spindle shafts 71, 71' whose pinions 71a, 71a' are rotated in opposite directions by a gear 79a which is supported on the shaft 79 of the motor 78. Shafts 71, 71' carry helical packing wings 71b, 71b' and terminate in heads 71c, 71c' which in turn are receivable in recesses of a pair of groove packers 81a, 81a' adapted to enter the mold through bores 64 of the turntable (FIG. 1). The winged groove packers 81a, 81a' have shafts 81, 81' which are rotatably lodged in bearings 83a, 83b and 83a', 83b' on two platforms 85a, 85b and carry pinions 81b, 81b' driven by a gear 84a; the shaft 84 of this gear extends from a motor 86 carried on the lower platform 85b. Platform 85a is rigidly supported at 82a, 82a' on upstanding posts 82, 82' whereas platform 85b is slidably mounted on these posts with the aid of bearings 82b, 82b' and is supported by a piston rod 88 whose head 88a is received in a cylinder 89 rising from a cross bar 90. The posts 82, 82' are firmly anchored to the base 93 of the machine.

Hydraulic fluid is supplied to the cylinders 77, 77' and 89 by two pumps 95a, 95b via respective four-way valves 96a, 96b. In the position illustrated in FIG. 2, pump 95a delivers fluid from sump 97 to the upper ends of cylinders 77, 77', thereby tending to raise the platforms 72a, 72b. Valve 96b is illustrated in a cutoff position in which pump 95b works into a suitable bypass (not shown) to return its output to the sump 97. It will be apparent that the valve 96a has another position in which the cylinders 77, 77' are caused to descend with respect to the stationary pistons 77b, 77b', as well as a cut-off position in which the platforms 72a, 72b are held stationary; similarly, valve 96b has two operative positions for raising or lowering the piston 88a together with platform 85b. These valves are controlled by switches 101, 102, 103 adapted to be actuated by a cam 100a on a rod 94a, carried on platform 72a, and by switches 104, 105 on post 82, actuatable by a cam 100 carried on a rod 94b which depends from platform 85b.

*Circuit Arrangement and Operation (FIGS. 2, 4)*

Figure 4:
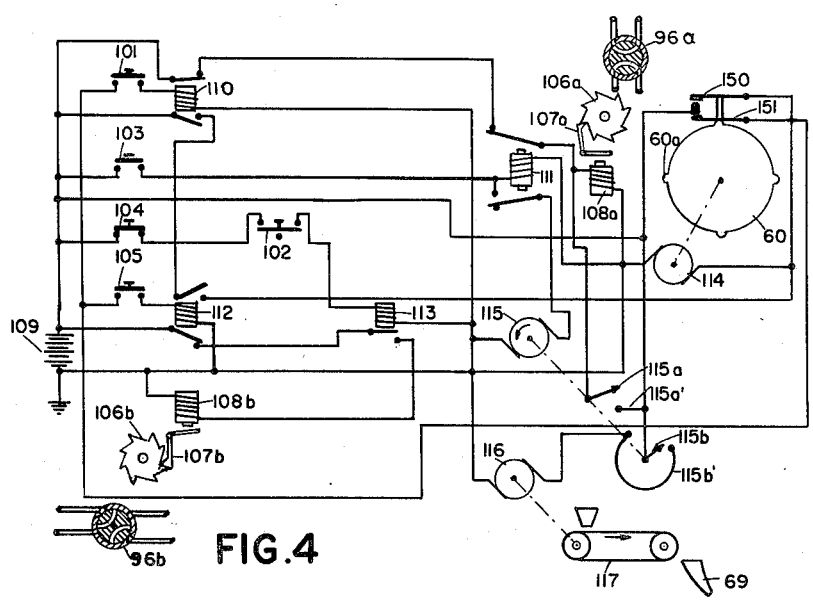
FIG. 4 is a circuit diagram for the machine of FIG. 2.

From FIG. 4 it will be seen that the switches 101, 103, 104 and 105 are normally open, switch 102 being normally closed and being connected in series with switch 104. The latter switch is shown closed in FIG. 4 because it is assumed that the machine 70 is in the position illustrated in FIG. 2 in which this switch is held depressed by the cam 100, platform 85b having risen to its highest point. Platforms 72a and 72b are near their lowest point and have just begun to rise, the spindle heads 71c, 71c' being thus in the process of leaving the groove packers 81a, 81a' while the cam 100a has just released the switch 103. Valve 96a is driven by a ratchet 106a whose pawl 107a is controlled by a magnet 108a; this magnet is energized in a circuit leading from a source of current, here shown as a battery 109, via a back contact of a relay 110 and a back contact of another relay 111 to ground. Pawl 107a is thus held attracted and poised to impart a 45° rotation to valve 96a upon the next de-energization of magnet 108a. Valve 96b is driven in a similar manner by a ratchet 106b whose pawl 107b is controlled by a stepping magnet 108b; the energizing circuit for this magnet extends from battery 109 over the back contacts of two relays 112, 113 and is open since relay 113 is operated in a circuit leading from battery 109 over closed switches 104 and 102 to ground.

Relays 110 and 111 are each provided with a second armature and an associated front contact which are connected in series between battery 109 and the right-hand input terminal of a motor 114 whose left-hand terminal is grounded. Motor 114 drives turntable 60 which is shown provided with four peripherally spaced cams 60a acting upon a pair of switch arms 151, 150 when the turntable is in one of its operating positions. An alternate energizing circuit for motor 114 extends from battery 109 over switch arm 150 through the motor winding to ground so that this motor will remain energized until the turntable has rotated through an angle of 90° into its next operative position. A circuit for the operation of relays 110 and 112 extends from battery 109 through switch arm 151 and hence to ground in two parallel branches, one branch including switch 101 in series with the winding of relay 110, the other branch including switch 105 in series with the winding of relay 112. Relay 111 is energizable in a circuit including the switch 103 and has a second armature and a front contact in series with the winding of a motor 115 which is energizable over this armature and front contact when the switch 103 is closed. Motor 115 drives a timer comprising a pair of wipers 115a, 115b, wiper 115a having a single bank contact 115a whereas wiper 115b co-operates with a contact strip 115b'. The engagement of contact 115a' by wiper 115a closes an alternate energizing circuit for stepping magnet 108a which shunts the back contacts and armatures of relays 110 and 111. Wiper 115b, when in contact with strip 115b', closes a circuit for the operation of a motor 116 which drives a conveyor 117 for feeding concrete to hopper 69. The motors 78 and 86 for the packing mechanism have not been shown in FIG. 4 because their operation is continuous and independent of the circuit elements shown in this figure.

As the platforms 72a and 72b continue their ascent, taking with them the spindle shafts 71, 71', cam 100a trips the switch 102 which opens momentarily and briefly releases the relay 113, thereby energizing the magnet 108b for a short period. Pawl 107b is thus attracted and released, thereby stepping ratchet 106b through one eighth of a revolution and advancing the valve 96b into a position in which pump 95b delivers fluid to the top of cylinder 89. As platform 85b begins to lower, cam 100 releases the switch 104 so as to de-energize relay 113 and operate the magnet 108b which once more attracts its armature. The withdrawal of shafts 81, 81' and 71, 71' from the mold 10 (FIG. 3) is so timed that the spindle heads 71c, 71c' and the groove packers 81a, 81a' leave the mold substantially simultaneously. Meanwhile, platform 72a has reached the collars 73a, 73a' on rods 73, 73', thereby lifting the platform 72c and raising the apron 69a off the mold. This action separates the pin 69b from cylinder 16 and allows the mold to be withdrawn from the machine by turntable 60.

As the platform 72a reaches the top of its operating stroke, cam 100a depresses the switch 101 and operates the relay 110 to release the magnet 108a. At about the same time the platform 85b has descended to its lowest point where cam 100b depresses switch 105 and operates the relay 112, thereby de-energizing the magnet 108b. Both valves 96a, 96b are thereby advanced to their respective cut-off positions in which the associated pistons and piston cylinders are immobilized with respect to each other. The simultaneous operation of relays 110 and 112 also closes the energizing circuits for turntable motor 114 so as to cause the previously filled mold to be delivered to the mold positioner 40 along with the locating of a fresh empty mold beneath the hopper 69.

Meanwhile, switch arm 151 had opened and re-closed its contacts as the turntable 60 rotated into its new position. The closure of these contacts, occurring as the turntable comes to rest, causes another stepping of ratchets 106a, 106b and advances the valves 96a, 96b into a position in which cylinders 77, 77' descend and piston 88a rises under pressure of the hydraulic fluid. Switches 101 and 105 open to release the relays 110 and 112 so that magnets 108a and 108b are once more energized. The movement of platform 72c is stopped as its apron 69a drops onto mold 10 and inserts its pin 69b into the tube 16 thereof. Platforms 72b and 72a continue their downward movement as cam 100a ineffectually trips and releases the switch 102. When the platform 85b reaches its highest position, cam 100 closes switch 104 and re-operates relay 113, thereby de-energizing the stepping magnet 108b and advancing the ratchet 106b to arrest the movement of piston 88a. Somewhat later, cam 100a depresses the switch 103 and energizes the relay 111 to break the operating circuit of magnet 108a whereby the ratchet 106a is advanced to arrest the movement of cylinders 77, 77'.

At this stage the shafts 71, 71' and 81, 81', rotating continuously, have reached the position illustrated in FIG. 3 in which heads 71c, 71c' are telescoped within groove packers 81a, 81a'. Relay 111, in attracting its armatures, energizes the motor 115 which starts the rotation of timer 115a, 115b. As the wiper 115b engages its contact strip 115b', motor 116 is operated to start the delivery of concrete to the mold. After a predetermined time interval, wiper 115a passes over contact 115a' and momentarily energizes the magnet 108a to advance the valve 96a by one further step. Now pump 95a again forces fluid into the upper part of cylinders 77, 77' so that platforms 72a and 72b begin to rise, cam 100a releasing the switch 103 so that relay 111 is deenergized. This relay may be slow-releasing in order to continue the operation of motor 115, with wiper 115b remaining in contact with strip 115b' for a short period sufficient to admit further concrete into the mold during the withdrawal of packing elements 71b, 71b' and 71c, 71c' therefrom. After wiper 115b has stepped off the strip 115b', relay 111 releases its armatures to restore the circuit to its condition shown in FIG. 4 and described above.

*Production of Curved Channels (FIGS. 7A, 7B)*

According to an embodiment of our invention, shaping machine 70 is provided with link means adapted to engage turntable 60 or a similar mold locator to produce arcuately channeled bodies. Advantageously, turntable 60 may be equipped with yieldably displaceable members such as a ball check 125 resiliently positioned at four equispaced locations about the periphery of turntable 60. The shaping machine 70 is provided, according to this modification, with a rack 120 rigidly secured to platform 72a, a pinion 122 journaled on a shaft 126 which is secured to upright 74 and driven by rack 120, and a lost-motion link 124 having a slot 124' adapted to receive ball check 125, this link being articulated at one extremity to pinion 122 at 123 and having its other extremity slidably secured at 127 to floor 80. In operation, turntable 60, after being driven into engagement with link 124 by motor 114, is moved a limited distance in a counterclockwise direction (as viewed in FIG. 1) during one-half of the downward stroke of platform 72 and returned in a clockwise direction during the second half thereof; an identical motion ensues during the upward stroke of that platform and the packing members attached thereto. In this manner, the combined movements of the packing members 71, 71' downwardly and upwardly, simultaneously with a forward and backward movement of the turntable 60, result in an arcuate channel within the body thus produced.

*Oscillating Platform (FIG. 5)*

In FIG. 5, we show another embodiment of the invention which operates similarly to that described as the first modification. In this embodiment, we provide a turntable 60" provided with plates 54" which, serving as mold-receiving posts, are equipped with bores 64 and lugs 63 as previously described. Plates 54" are limitedly displaceable on rollers 50 in a direction generally tangential to turntable 60". A yieldably displaceable member 141, such as a ball check, is connected via a rod 142 to plate 54". This modification operates in a manner similar to that of the system of FIGS. 7A and 7B, member 141 being engageable in slot 124' of link 124 to produce an oscillatory motion equivalent to that previously described.

*Tilting Platform (FIG. 6)*

Figure 6:
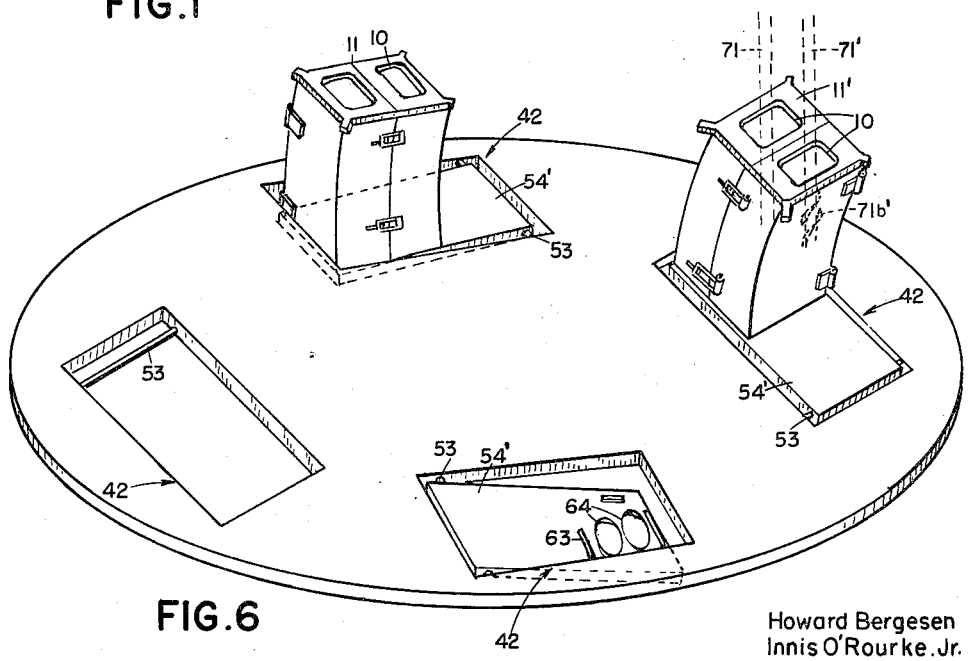
FIG. 6 is a view similar to that of FIG. 5, showing another turntable modification.
Figure 2:
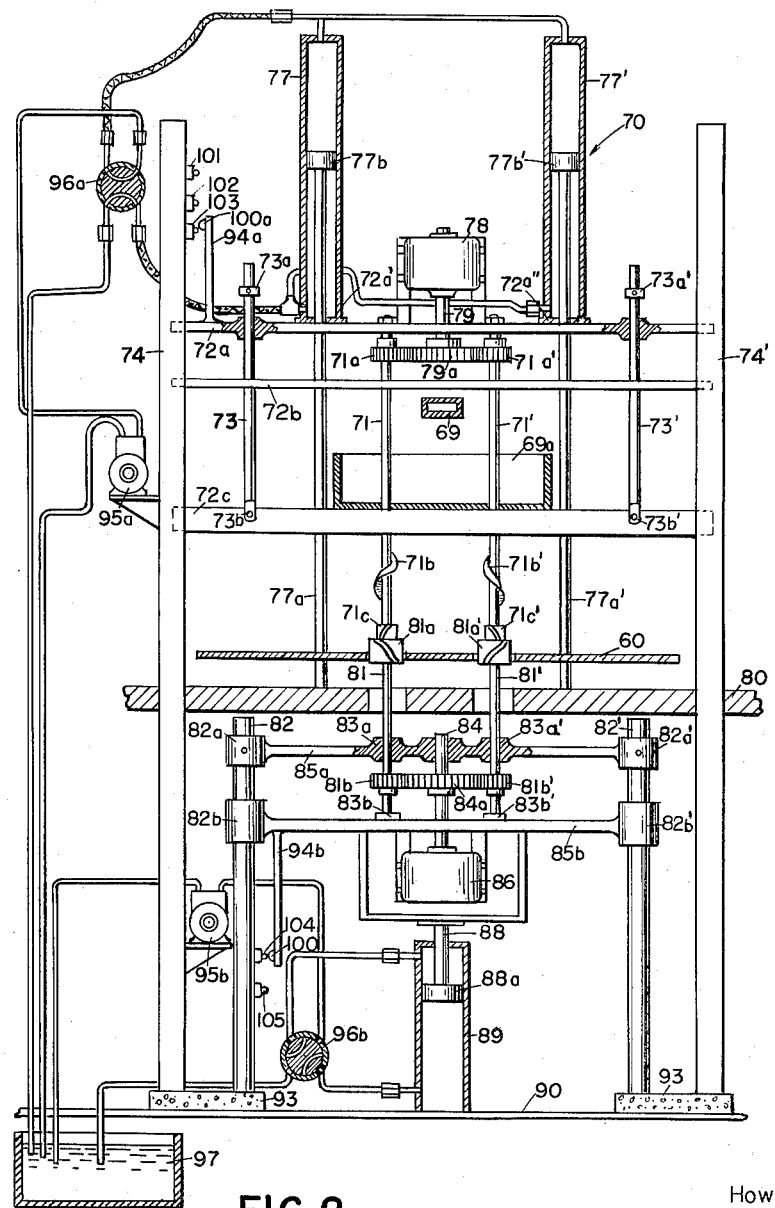
FIG. 2 is a partly diagrammatic elevational view of a shaping machine forming part of the plant of FIG. 1.

In FIG. 6 we show a further embodiment of our invention adapted to produce arcuately channeled bodies comprising a turntable 60' having plates 54' at mold-receiving posts 42 equipped with bores 64 and lugs 63. The plates 54' are angularly displaceable about fulcra 53 which may be shafts journaled in those plates. Plates 54' may be engaged by a rocker lever 134 (FIG. 7B) whose fulcrum 133 is secured to floor 80 and which is articulated at an extremity 132 to a linkage arm 131 connected at 130 to rack 120. During the downward stroke of platform 72a, rocker lever 134 engages plate 54' to oscillate that plate upwardly in the course of that stroke and downwardly during the subsequent upward stroke of the platform, thus producing an arcuate channel in the body being formed on that plate.

A concrete body 21' with arcuate channel 22', adapted to be produced by the system of FIGS. 5, 6 or 7A, 7B, is shown in FIG. 8.

It will be understood that turntable 60 may also be rotated manually and that in this case the motor 114 might be replaced by a lamp or some other signaling device to indicate the readiness of the machine to start another cycle. On the other hand, it is also possible to provide automatic means known per se for operating the mold-positioner motor in timed relationship with the movements of the turntable.

It will be apparent that the system according to our invention is dependable in its operation and provides direct control for producing a wide variety of products. Thus, turntables 60, 60', or 60" may be interchangeable, or the plates 54', 54" of turntables 60', 60" may be secured in proper alignment for producing straight cavities without replacing the turntables. Again, the length of the piston strokes of the machine 70, the length of the compacting operation as measured by the timer 115a, 115b, the rate of withdrawal of the packing elements from the mold and other operating factors can be readily adjusted by such expedients as a change in the positions of limit switches 101–105, control of the timer-motor speed, and variation of the delivery rates of pumps 95a and 95b.

The mechanical linkage between the mold support and the shaping machine of FIGS. 5, 6, 7A and 7B insures an exact synchronization between the vertical reciprocation of the packer elements and the horizontal or rotary oscillations of the mold support. It will be understood, however, that the two movements could also be co-ordinated by other means (e.g. hydraulically or electrically) if care is taken to insure proper synchronization. Our invention, accordingly, is not limited to the specific embodiments described and illustrated but may be modified in various ways without departing from the spirit and scope thereof as defined in the appended claims.

We claim:

1. A plant for producing concrete bodies with at least one arcuate channel lying substantially along a plane, comprising:
   a mold conforming to the external shape of said bodies;
   a support carrying said mold while being displaceable along said plane;
   hopper means adjacent said support for introducing a moldable concrete composition into said mold;
   a shaft carrying shaping means reciprocable in said plane into and out of said mold for compacting said composition and forming a channel in the conrete body molded therefrom;
   drive means for rotating said shaft;
   actuating means for axially displacing said shaft linearly in said plane toward and away from said support; and
   link means operatively interconnecting said actuating means and said support for transmitting to the latter an oscillatory motion, having a component transverse to said shaft, simultaneously and so co-ordinated with the linear displacement of said shaft as to impart a predetermined curvature to said channel.

2. A plant according to claim 1, further comprising a turntable carrying said support.

3. A plant according to claim 2 wherein said link means comprises an oscillatory member adjacent the periphery of said turntable and co-operating means at said periphery releasably engageable with said oscillatory member for angular entrainment of said support by said member.

4. A plant according to claim 1 wherein said support comprises a tiltable platform.

5. A plant according to claim 1 wherein said support comprises a horizontally displaceable platform.

6. A plant according to claim 1, further comprising a turntable and a plurality of mold-carrying support platforms on said turntable, each of said platforms being independently displaceable by said link means relatively to said turntable.

References Cited in the file of this patent

UNITED STATES PATENTS

| | | |
|---|---|---|
| 819,931 | Schenk et al. | May 8, 1906 |
| 1,863,839 | Duff | June 21, 1932 |
| 1,899,115 | Schultz | Feb. 28, 1933 |
| 1,977,257 | Williams | Oct. 16, 1934 |
| 2,178,015 | Bronetti | Oct. 31, 1939 |
| 2,508,293 | Powell | May 16, 1950 |
| 2,530,687 | Dixon | Nov. 21, 1950 |
| 2,682,695 | Ramsey | July 6, 1954 |